United States Patent
Barger

[11] Patent Number: 6,155,650
[45] Date of Patent: Dec. 5, 2000

[54] ANTI-DUST AND COOLING COVER FOR BRAKE ASSEMBLY

[76] Inventor: Robert E. Barger, 5615 Fuchs Circle Pl., Marbury, Md. 20658

[21] Appl. No.: 09/404,242

[22] Filed: Sep. 22, 1999

[51] Int. Cl.[7] .................................................. F16D 65/78
[52] U.S. Cl. ................ 301/6.3; 188/218 A; 188/264 AA
[58] Field of Search ........................... 301/6.1, 6.3, 6.91, 301/37.1; 188/218 A, 264 A, 264 AA

[56] References Cited

U.S. PATENT DOCUMENTS

| | | | |
|---|---|---|---|
| 2,659,460 | 11/1953 | Lyon | 301/6.3 X |
| 2,759,572 | 8/1956 | Lyon | 301/6.3 X |
| 3,861,501 | 1/1975 | Brooks et al. | 188/218 A X |
| 4,135,764 | 1/1979 | Johnson et al. | 301/6.3 |
| 4,332,310 | 6/1982 | Iwai et al. . | |
| 4,484,667 | 11/1984 | Bottieri, Jr. | 188/218 A |
| 4,550,809 | 11/1985 | Kawaguchi . | |
| 5,238,090 | 8/1993 | Weiler . | |
| 5,293,967 | 3/1994 | Siegrist . | |
| 5,474,160 | 12/1995 | Siegrist . | |
| 5,560,073 | 10/1996 | Ragas . | |
| 5,671,827 | 9/1997 | Demetriou et al. . | |
| 5,772,286 | 6/1998 | Jordan . | |

FOREIGN PATENT DOCUMENTS

| | | |
|---|---|---|
| 204433 | 12/1986 | European Pat. Off. . |
| 2072280 | 9/1981 | United Kingdom . |
| 2223462 | 4/1990 | United Kingdom ................... 301/6.3 |

*Primary Examiner*—Russell D. Stormer
*Attorney, Agent, or Firm*—Richard C. Litman

[57] ABSTRACT

An anti-dust and cooling cover adapted for being positionable between a wheel and a brake assembly of a vehicle and being in rotation with the wheel and the brake assembly is disclosed. The cover includes a plate and a wall, and is adapted for substantially surrounding the assembly. The plate has an outer surface, an inner surface, a perimeter, a plurality of holes, and an opening. When the cover is positioned between the wheel and the assembly, the outer surface of the plate is adjacent to the wheel while the inner surface of the plate is adjacent to the assembly. The wall has an outer surface, an inner surface, a plurality of openings along the wall, and a plurality of louvers fixed along the outer surface of the wall. The wall projects perpendicularly from the plate along the perimeter of the plate to form the cover. When the wheel, the assembly, and the cover are in rotation due to the vehicle moving forward, air about the louvers and the openings of the wall is scooped up by the louvers and is drawn into the chamber through the openings of the wall to create air flow.

7 Claims, 4 Drawing Sheets

ANTI-DUST AND COOLING COVER FOR BRAKE ASSEMBLY

BACKGROUND OF THE INVENTION

1. Field of the Invention

The present invention relates generally to brake fans and covers. More specifically, the invention is an anti-dust and cooling cover adapted for being positionable between a wheel and a brake assembly of a vehicle and being in rotation with the wheel and the brake assembly.

2. Description of the Related Art

Many people would like to own a cover or device for extending the effective life period of brakes or brake systems, and/or for preventing the accumulation of debris and fluids on wheels and/or brake systems. However, most covers or devices do not effectively accomplish either or both of these tasks. An anti-dust and cooling cover which effectively extends the effective life period of brakes or brake systems would therefore be desirable. An anti-dust and cooling cover which effectively prevents the accumulation of debris and fluids on wheels and/or brake systems would also be desirable. An anti-dust and cooling cover which is inexpensive would further be desirable. The present invention achieves these goals through a circular plate and a cylindrical wall that projects perpendicularly from the plate and that includes a plurality of louvers.

Various forms of covers and devices for preventing accumulation of debris, fluids, etc. in wheels and brakes systems and/or for cooling the systems are known. U.S. Pat. No. 4,332,310 issued on Jun. 1, 1982 to Iwai et al. discloses a device for preventing intrusion of water, dust, etc. into a drum brake of an automobile vehicle wherein a labyrinth is formed at a fitting portion between the outer peripheral surface of a brake panel fixed to the vehicular body and the outer peripheral surface of a brake drum rotatable together with wheels. U.S. Pat. No. 4,434,667 issued on Nov. 27, 1984 and European Patent No. 204,433, published Dec. 10, 1986, to Bottieri, Jr. disclose a shield plate adapted for being clamped between a wheel and a disc brake assembly. The shield plate has a circular peripheral edge which slidably engages the inside of the wheel at its tire-supporting rim and circumferentially spaced slits extending inward from this edge to provide flexible and resilient fingers in succession along the periphery. U.S. Pat. No. 4,550,809 issued on Nov. 5, 1985 and Great Britain Patent No. 2,072,280 A, published on Sep. 30, 1981, to Kawaguchi disclose a disc brake system for a motorcycle having a wheel hub that includes a brake disc fixed on one side of the hub to rotate with the hub.

U.S. Pat. No. 5,238,090 issued on Aug. 24, 1993 to Weiler discloses a disc brake housing with continuous outside circumferential edge and cooling ribs. U.S. Pat. Nos. 5,293,967 issued on Mar. 15, 1994 and U.S. Pat. No. 5,474,160 issued on Dec. 12, 1995 to Siegrist disclose a shielded vehicle brake in combination with a hub that includes fan blades intermediate the securing surface and the align ports, and with a fanned hub support arrangement, respectively. U.S. Pat. No. 5,560,073 issued on Oct. 1, 1996 to Ragas discloses a brake dust removal apparatus that includes 2 housings hinged together that may be closed. U.S. Pat. No. 5,671,827 issued on Sep. 30, 1997 to Demetriou et al. discloses a disc brake apparatus comprising an annular brake disc constructed of friction plates spaced by a plurality of vanes extending radially along an inner face of the friction plates. U.S. Pat. No. 5,772,286 issued on Jun. 30, 1998 to Jordan discloses a wheel dust filter.

None of the above inventions and patents, taken either singularly or in combination, is seen to describe the instant invention as claimed. Thus an anti-dust and cooling cover adapted for being positionable between a wheel and a brake assembly of a vehicle solving the aforementioned problems is desired.

SUMMARY OF THE INVENTION

The present invention is directed to an anti-dust and cooling cover adapted for being positionable between a wheel and a brake assembly of a vehicle and being in rotation with the wheel and the brake assembly. The cover comprises a circular plate and a cylindrical wall, and is adapted for substantially surrounding the assembly.

The plate has an outer surface, an inner surface, a perimeter, a plurality of holes, and an opening. When the cover is positioned between the wheel and the assembly, the outer surface of the plate is adjacent to the wheel while the inner surface of the plate is adjacent to the assembly.

The wall has an outer surface, an inner surface, a plurality of openings along the wall, and a plurality of louvers fixed along the outer surface of the wall. The wall projects perpendicularly from the plate along the perimeter of the plate to form the cover.

When the wheel, the assembly, and the cover are in rotation due to the vehicle moving forward, air about the louvers is scooped up by the louvers and is drawn into a chamber defined between the cover and the assembly through the openings along the wall to create air flow.

Accordingly, it is a principal object of the invention to provide an anti-dust and cooling cover which extends the effective life period of brakes or brake systems.

It is another object of the invention to provide an anti-dust and cooling cover which extends the effective life period of wheel bearings associated with the brake assembly.

It is a further object of the invention to provide an anti-dust and cooling cover which eliminates the brake fade condition that affect brakes.

It is an additional object of the invention to provide an anti-dust and cooling cover which prevents the accumulation of debris and fluids on wheels and/or brake systems.

It is an object of the invention to provide improved elements and arrangements thereof in a device for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
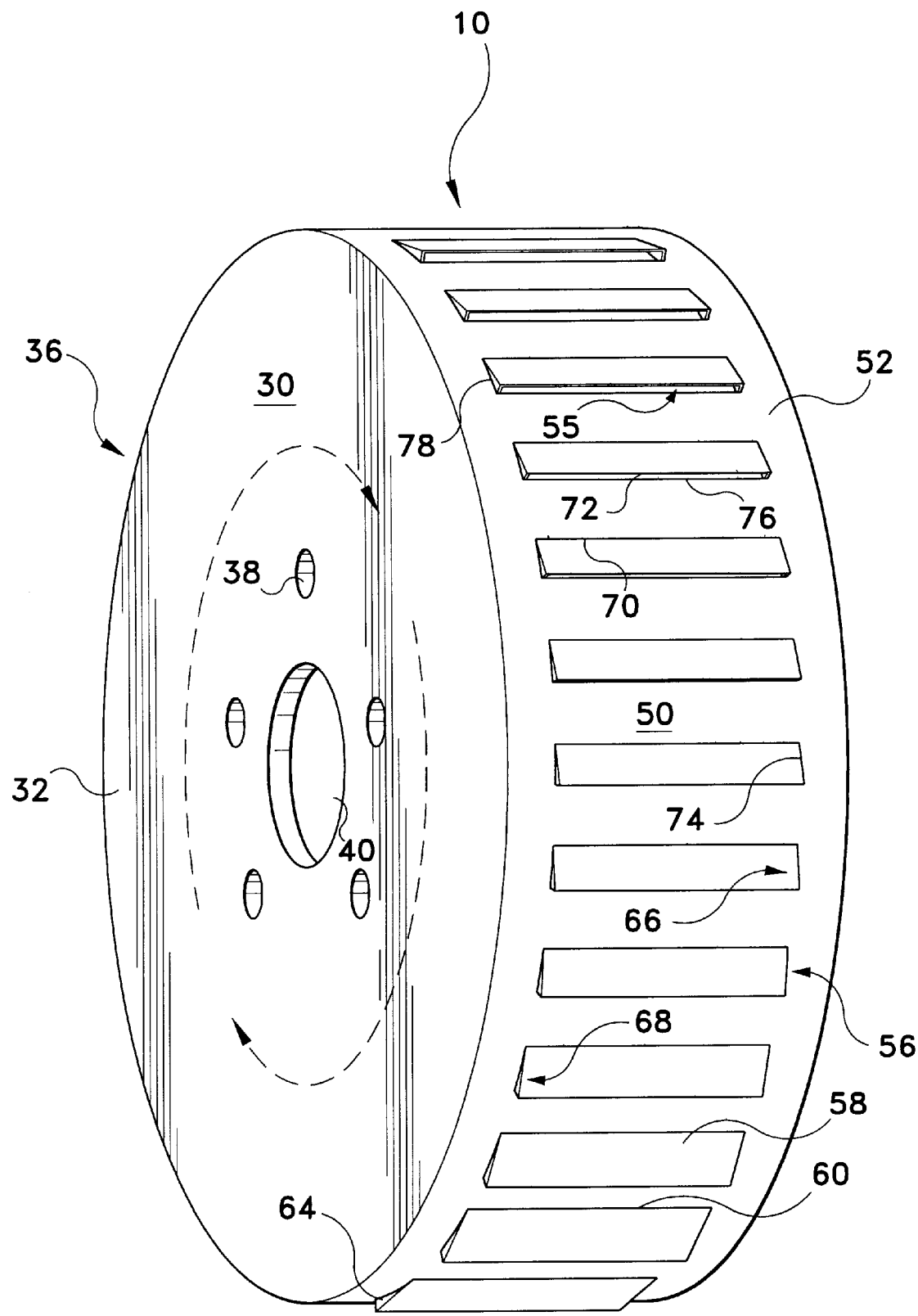
FIG. 1 is a front, perspective view of an anti-dust and cooling cover for a brake assembly according to the present invention.

Referring to FIGS. 1–4, the present invention is directed to an anti-dust and cooling cover 10 adapted for being positionable between a wheel 12 and a brake assembly 20 of a vehicle, such as an automobile, a truck, a sport utility vehicle, and the like, and being in rotation with the wheel 12 and the brake assembly 20. The assembly 20 may be of a conventional design of a disc brake assembly that includes a brake pad-caliper assembly 22, a rotor 24, and a plurality of wheel bolts 26. The cover 10 comprises a flat, circular plate 30 and a cylindrical wall 50, and is adapted to be in communication with and to substantially surround the assembly 20.

Figure 2:
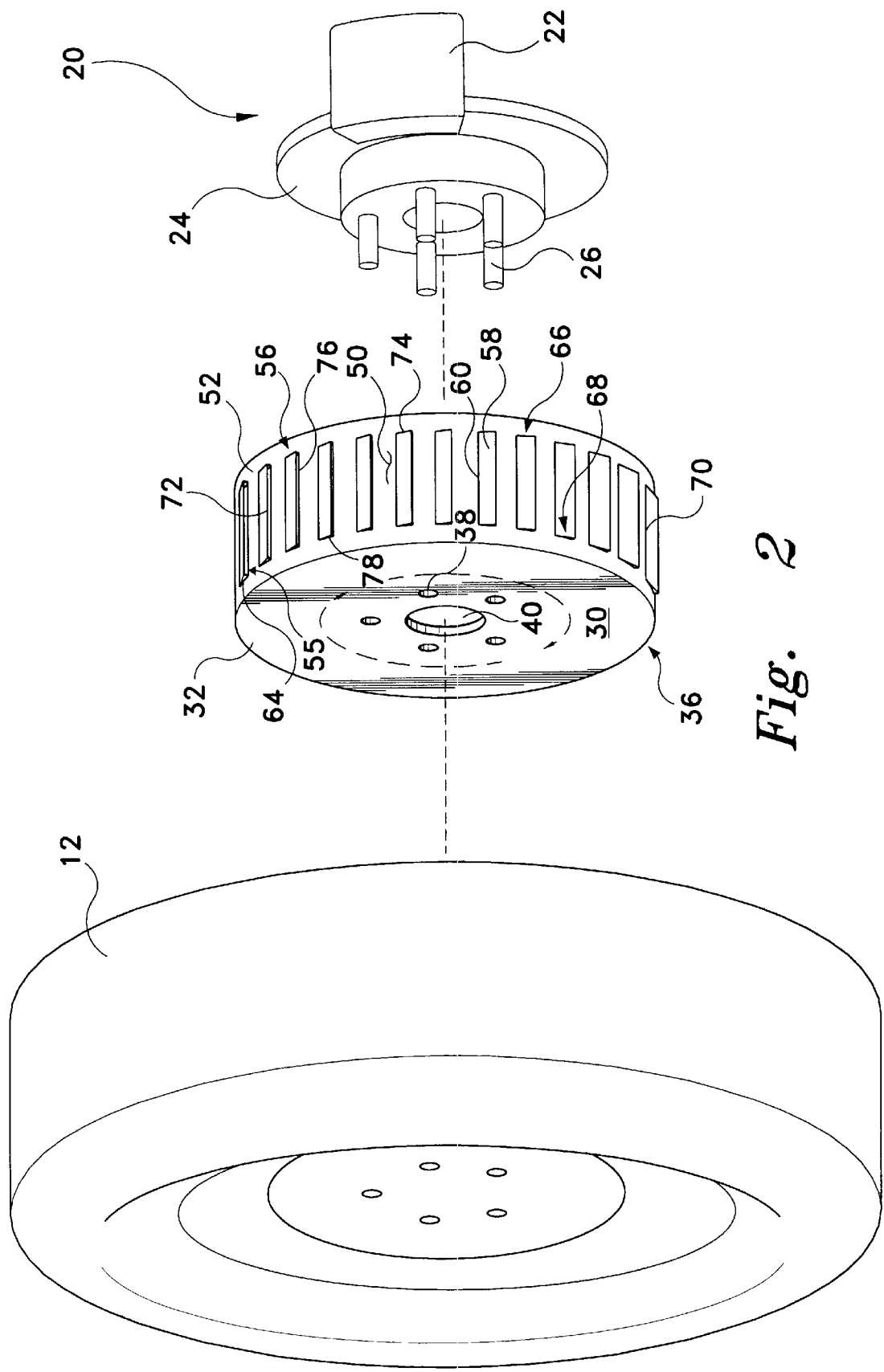
FIG. 2 is an environmental, front, perspective view of an anti-dust and cooling cover for a brake assembly according to the present invention.
Figure 3:
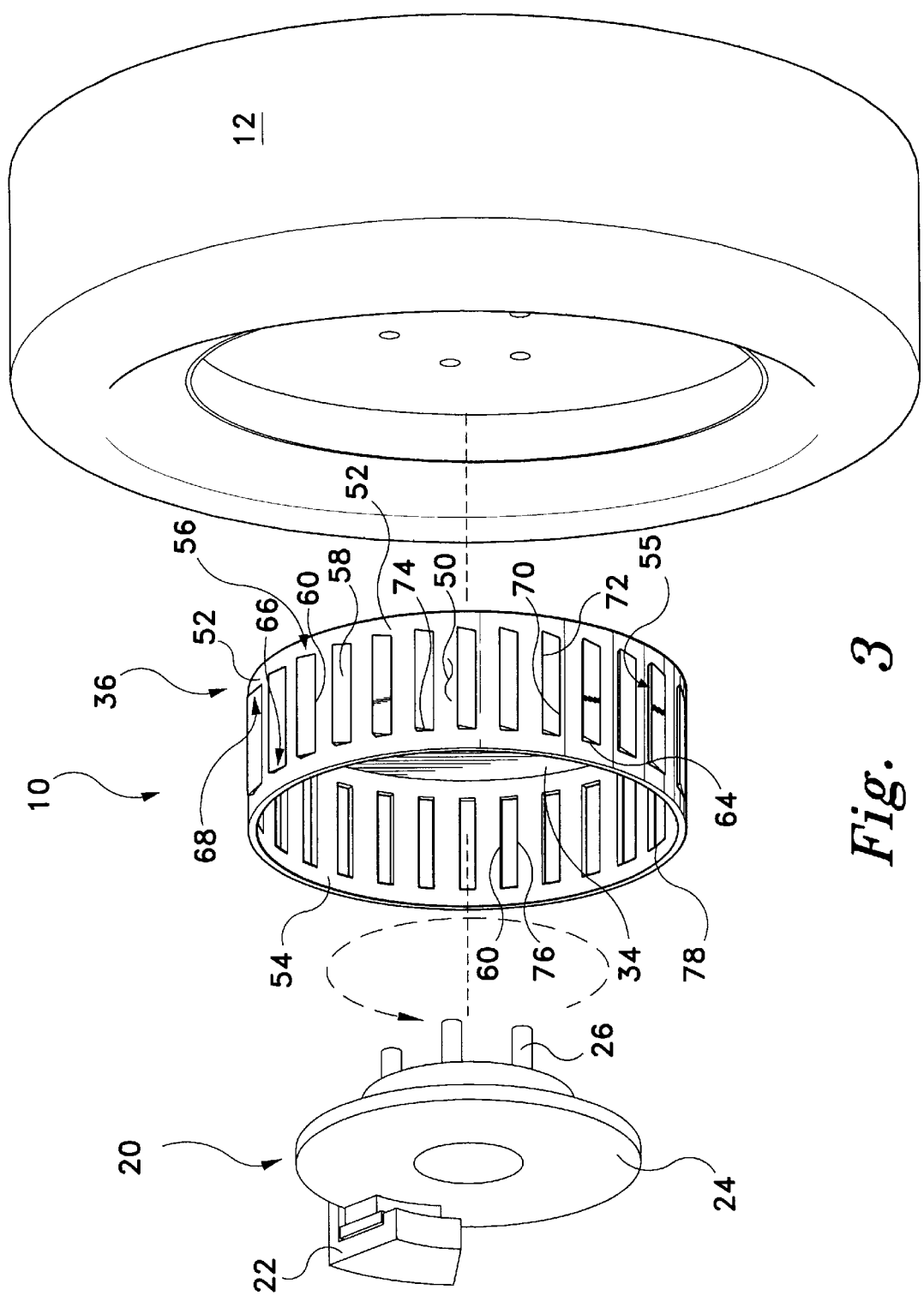
FIG. 3 is a rear, perspective view of an anti-dust and cooling cover for a brake assembly according to the present invention.
Figure 4:
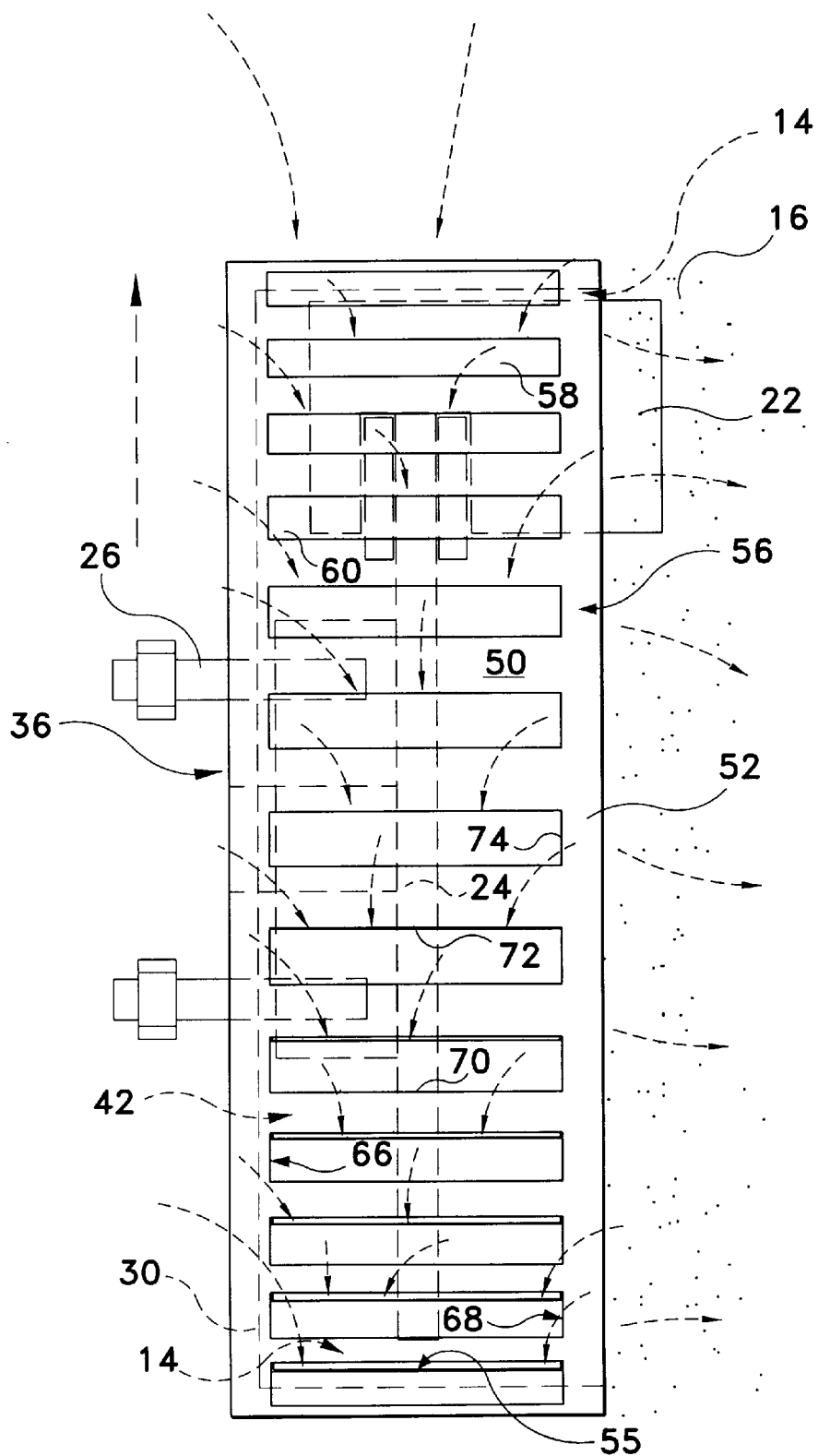
FIG. 4 is an environmental, plan view of an anti-dust and cooling cover for a brake assembly, in rotation when the cover and the brake assembly are in communication with one another, according to the present invention.

As shown in FIGS. 1–3, the plate 30 has an outer surface 32, an inner surface 34, a perimeter 36, a plurality of holes 38 at predetermined locations along the plate 30, and an opening 40 at a predetermined location along the plate 30. When the cover 10 is positioned between the wheel 12 and the assembly 20 (as shown in FIGS. 2–4), the plate 30 and the rotor 24 of the assembly 20 are parallel to one another, the outer surface 32 of the plate 30 is adjacent to the wheel 12, and the inner surface 34 of the plate 30 is adjacent to the assembly 20. The holes 38 are adapted for permitting the bolts 26 to pass through the holes 38 and the opening 40 is adapted for permitting an end of an axle spindle (not shown) to pass through the opening 40 so that the cover 10 can substantially surround the assembly 20 and form a chamber 42 therebetween.

As shown in FIGS. 1–4, the wall 50 has an outer surface 52, an inner surface 54, a plurality of elongated, rectangular openings 55 at predetermined locations along the wall 50, and a plurality of louvers 56 fixed at predetermined locations along the outer surface 52 of the wall 50. The wall 50 projects perpendicularly from the plate 30 along the perimeter 36 of the plate 30 to form the cover 10. Each of the louvers 56 is formed by an elongated, rectangular plate 58 extending at an angle from a first lengthwise edge 60 of a respective rectangular opening 55 in the wall 50 and by two substantially triangular end plates 64. The rectangular plate 58 has a first end 66, a second end 68, a first lengthwise edge 70, a second lengthwise edge 72, and two side edges 74. The first lengthwise edge 70 of the rectangular plate 58 is attached to the wall 50 while the second lengthwise edge 72 of the rectangular plate 58 is a free edge. The rectangular plate 58 is connected to the respective rectangular opening 55 such that the first lengthwise edge 70 of the rectangular plate 58 is coextensive with the first lengthwise edge 60 of the respective rectangular opening 55. The second lengthwise edge 72 of the rectangular plate 58 is spaced apart from a second lengthwise edge 76 of the respective rectangular opening 55 opposite the first lengthwise edge 60 of the respective rectangular opening 55 along which the rectangular plate 58 is attached. Each of the end plates 64 extends between a respective side edge 74 of the rectangular plate 58 and a corresponding side edge 78 of the respective rectangular opening 55 at a corresponding end 66, 68 of the rectangular plate 58. The rectangular plate 58 and the end plates 64 cooperatively form a scoop over the respective rectangular opening 55 and also cooperatively define a louver 56.

When the wheel 12, the assembly 20, and the cover 10 are in rotation relative to one another due to the vehicle moving forward (as shown in FIGS. 2 and 4), air about the louvers 56 and the openings 55 of the wall 50 is scooped up by the louvers 56 and is drawn into the chamber 42 through the openings 55 of the walls 50 to create air flow. The air flow helps to cool the assembly 20 and to minimize or prevent the accumulation of fluids and debris 16, such as water, brake fluid, mud, brake dust, dirt, and the like, on the assembly 20 and/or the wheel 12 by circulating air within the chamber 42.

As shown in FIG. 4, the air flow also directs the fluids and the debris 16 away from the assembly 20 and the cover 10 and under the vehicle through a gap 14 between the rotor 24 and the cover 10. The gap 14 extends around the entire circumference of the rotor 24, and is created when the cover 10 is positioned adjacent to the rotor 24. The cooling and preventive effects help to extend the effective life period of the assembly 20, especially the brake pad of the brake pad-caliper assembly 22, and to keep the assembly 20 and the wheel 12 in a cleaner condition than if there were no cover 10.

It is preferred that the cover 10 be fabricated in one piece from a single piece of stock material. It is also preferred that the cover 10 be made from metal, lightweight, sufficiently rigid to maintain its shape under adverse road conditions, but the cover 10 can also be made of any well known material in the art.

It is to be understood that the present invention is not limited to the embodiments described above, but encompasses any and all embodiments within the scope of the following claims.

I claim:

1. An anti-dust and cooling cover adapted for being positionable between a wheel and a brake assembly of a vehicle and being in rotation with the wheel and the brake assembly, said cover comprising:

a plate having an outer surface, an inner surface, and a perimeter, said outer surface of said plate being adjacent to the wheel and said inner surface of said plate being adjacent to the assembly when said cover is positioned between the wheel and the assembly; and a wall having an outer surface, an inner surface, a plurality of openings located at predetermined locations along said wall, and a plurality of louvers fixed at predetermined locations along said outer surface of said wall, said wall projecting perpendicularly from said plate along said perimeter of said plate to form said cover wherein said cover is adapted for being in communication with the assembly, and is dimensioned and configured for substantially surrounding the assembly whereby a chamber is formed therebetween, each of said louvers forming a hood over a corresponding opening of said openings in said wall wherein air about said louvers and said openings in said will is scooped up by said louvers and is drawn into said chamber though said openings of the wall when the wheel, the assembly, and said cover are in rotation relative to one another.

2. The cover according to claim 1 wherein:

said plate is circular and said wall is cylindrical.

3. The cover according to claim 1 wherein:

said plate and a rotor of the assembly are adjacent and parallel to one another when said cover is in communication with the assembly.

4. The cover according to claim 1 wherein:

said cover is manufactured of one piece construction.

5. The cover according to claim 1 wherein:

said plate further has a plurality of holes at predetermined locations along said plate, and an opening at a predetermined location along said plate, each of said holes being adapted for permitting a corresponding bolt of a plurality of wheel bolts of the assembly to pass through each of said holes, said opening being adapted for permitting an end of an axle spindle of the vehicle to pass through said opening.

6. The cover according to claim 1 wherein:

each of said louvers is formed by a plate extending at an angle from a first lengthwise edge of a respective opening of said openings in said wall and by two end plates, said plate of each of said louvers having a first end, a second end, a first lengthwise edge, a second lengthwise edges and two side edges, said first lengthwise edge of said plate being attached to said wall and said second lengthwise edge of said plate being a free edge wherein said plate of each of said louvers is connected to said respective opening wherein said first lengthwise edge of said plate is coextensive with said first lengthwise edge of said respective opening, said second lengthwise edge of said plate being spaced apart from a second lengthwise edge of said respective opening opposite said first lengthwise edge of said opening along which said plate of each of said louvers is attached, said end plates extending between said side edges of said plate of each of said louvers and two side edges of said respective opening at each end of said plate of each of said louvers whereby said plate of each of said louvers and said end plates cooperatively form a scoop over said respective opening and also cooperatively define a respective louver of said louvers.

7. The cover according to claim 6 wherein:

each of said openings in said wall is rectangular;

said plate of each of said louvers is elongated and rectangular; and each of said end plates is substantially triangular.

* * * * *